United States Patent
Aga et al.

(10) Patent No.: US 11,847,061 B2
(45) Date of Patent: Dec. 19, 2023

(54) APPROACH FOR SUPPORTING MEMORY-CENTRIC OPERATIONS ON CACHED DATA

(71) Applicant: Advanced Micro Devices, Inc., Santa Clara, CA (US)

(72) Inventors: Shaizeen Aga, Santa Clara, CA (US); Nuwan Jayasena, Santa Clara, CA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/385,783

(22) Filed: Jul. 26, 2021

(65) Prior Publication Data

US 2023/0021492 A1    Jan. 26, 2023

(51) Int. Cl.
*G06F 12/08* (2016.01)
*G06F 13/16* (2006.01)
*G06F 12/02* (2006.01)
*G06F 12/0891* (2016.01)
*G06F 12/0811* (2016.01)

(52) U.S. Cl.
CPC ...... *G06F 12/0891* (2013.01); *G06F 12/0238* (2013.01); *G06F 12/0811* (2013.01); *G06F 13/1668* (2013.01)

(58) Field of Classification Search
CPC ............. G06F 12/0891; G06F 12/0238; G06F 12/0811; G06F 13/1668
See application file for complete search history.

(56) References Cited

U.S. PATENT DOCUMENTS

| | | |
|---|---|---|
| 2011/0202726 A1 | 8/2011 | Laycock et al. |
| 2013/0145089 A1 | 6/2013 | Eleftheriou et al. |
| 2014/0258635 A1 | 9/2014 | Hong et al. |
| 2015/0135003 A1 | 5/2015 | Cota-Robles et al. |

(Continued)

FOREIGN PATENT DOCUMENTS

KR   20150082010   *  7/2015   ............ G06F 12/08

OTHER PUBLICATIONS

International Searching Authority, "Written Opinion", in International Application No. PCT/US2022/037752, dated Nov. 1, 2022, 5 pages.

(Continued)

*Primary Examiner* — Masud K Khan
(74) *Attorney, Agent, or Firm* — Hickman Becker Bingham Ledesma LLP (57) ABSTRACT

A technical solution to the technical problem of how to support memory-centric operations on cached data uses a novel memory-centric memory operation that invokes write back functionality on cache controllers and memory controllers. The write back functionality enforces selective flushing of dirty, i.e., modified, cached data that is needed for memory-centric memory operations from caches to the completion level of the memory-centric memory operations, and updates the coherence state appropriately at each cache level. The technical solution ensures that commands to implement the selective cache flushing are ordered before the memory-centric memory operation at the completion level of the memory-centric memory operation.

20 Claims, 5 Drawing Sheets

(56) References Cited

U.S. PATENT DOCUMENTS

2017/0293487 A1* 10/2017 Che .................... G06F 9/30047
2018/0336133 A1* 11/2018 Turner ................ G06F 12/1072

OTHER PUBLICATIONS

International Searching Authority, "Search Report", in International Application No. PCT/US2022/037752, dated Nov. 1, 2022, 3 pages.

* cited by examiner

Thread A

While convergence reached:

Host code
      {
      Read and update arrays P[ ], Q[ ] and R[ ]
      }

PIM code
      {
      Read and update array Q[ ]
      }

FIG. 4

APPROACH FOR SUPPORTING MEMORY-CENTRIC OPERATIONS ON CACHED DATA

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers that allow some computations to be performed locally, such as arithmetic computations. This allows a memory controller to trigger local computations at multiple memory modules in parallel without requiring data movement across the memory module interface, which can greatly improve performance, particularly for data-intensive workloads.

One of the technical problems of offloading computations to memory, for example to take advantage of PIM technology, is that memory-side processing may need data that is stored in a processor-side cache. Thus, while a cache coherence mechanism can be relied upon to maintain the single-writer-or-multiple-readers guarantee for processor cores of a coherence domain for core-centric operations, the cache coherence mechanism cannot provide that guarantee for memory-centric operations, e.g., computations using PIM, whose completion point is beyond the coherence domain.

One solution to address this technical problem is to flush processor-side caches to memory. Not only does this operation consume a considerable amount of computational and storage resources, but it can also be wasteful if data that does not need to be flushed is included. In addition, flushing data from processor-side caches all the way to main memory is wasteful when a memory-centric operation is performed at caches located outside the coherence domain but before main memory, e.g., at a memory-side cache. Another solution is for core-centric processing to forego using caches, but this prevents realizing the many benefits of using caches for core-centric computations and is insufficient in systems that have memory-side caches. A further solution is to include both memory and memory-side caches in the coherence domain, but this would greatly increase the complexity of coherence protocols.

There is, therefore, a need for a technical solution to the technical problem of how to support memory-centric operations on processor-side cached data that does not have the drawbacks of prior solutions.

BRIEF DESCRIPTION OF THE DRAWINGS

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Cache Architecture
III. Completion Level-Specific Write Back of Cached Data
  A. Introduction
  B. Invoking Write Back Functionality
  C. Level Specific Write Back Commands
  D. Enforcing Ordering of Level Specific Write Back Commands
  E. Coherence Directory Implementations I. Overview A technical solution to the technical problem of how to support memory-centric operations on cached data uses a novel operation that invokes write back functionality on cache controllers and memory controllers. The write back functionality enforces selective flushing of dirty, i.e., modified, cached data that is needed for memory-centric memory operations from caches to the completion level of the memory-centric memory operations, and updates the coherence state appropriately at each cache level. The technical solution ensures that commands to implement the selective cache flushing are ordered before the memory-centric memory operation at the completion level of the memory-centric memory operation. As used herein, the term "core-centric memory operation" refers to a memory operation that has a completion point within the coherence domain, is tracked for completion at the core, and for which ordering is enforced at the core. As used herein, the term "memory-centric memory operation" refers to a memory operation that has a completion point beyond the coherence domain, is not tracked for completion at the core, and for which ordering is not enforced at the core.

The technical solution provides an efficient and correct way to selectively make dirty cached data that is needed for memory-centric memory operations available at the completion levels of the memory-centric memory operations. The solution avoids flushing data from caches that is not needed for memory-centric memory operations and also does not flush data beyond the completion level of the memory-centric memory operations where it is needed. This allows cores to issue memory-centric memory operations on potentially cached data while maintaining the single-writer-ormultiple-reader guarantee. The solution also allows fine-grained interleaving of memory-centric and core-centric memory operations without explicit cache management at the application level.

II. Cache Architecture

Figure 1:
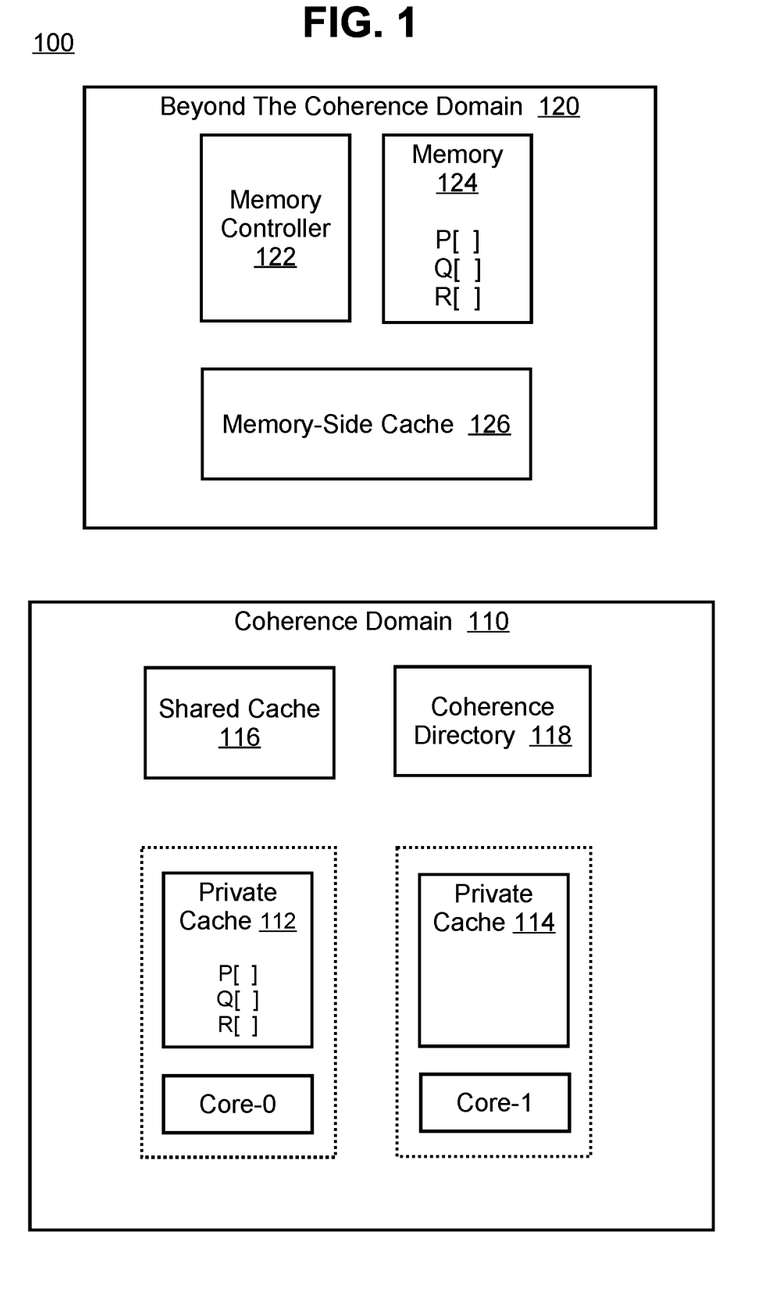
FIG. 1 depicts an example cache architecture that includes a coherence domain and a beyond the coherence domain.

FIG. 1 depicts an example cache architecture 100 that includes a coherence domain 110 and a beyond the coherence domain 120. The coherence domain 110 includes two cores "Core-0" and "Core-1" and three caches that include private caches 112, 114 and a shared cache 116. The private caches 112, 114 are, for example, L1 caches for the cores Core-0 and Core-1, respectively, and each of the private caches 112, 114 includes a cache controller that is not depicted in FIG. 1. The shared cache 116 is, for example, an L2 cache shared by the cores Core-0 and Core-1. Although implementations are described herein in the context of a two-level cache architecture, i.e., the private caches 112, 114 and the shared cache 116, implementations are not limited to this example and the approaches described herein are applicable to cache architectures with any number of levels. The coherence domain 110 also includes a coherence directory 118 that is used to provide cache coherency in accordance with a cache coherency protocol used by the coherence domain 110. Implementations are applicable to any type of cache coherence protocol. The beyond the coherence domain 120 portion of the cache architecture 100 depicted in FIG. 1 is one example and implementations are applicable to coherence domains having any number and type of cores and caches.

The beyond the coherence domain 120 portion of the cache architecture 100 is a domain that is beyond the last coherence point of the coherence domain 110 and in the example of FIG. 1 includes a memory controller 122, a corresponding memory 124, and a memory-side cache 126. The memory-side cache 126 has a corresponding cache controller, and the memory 124 can include processing elements, such as DRAM PIM elements. The coherence domain 110 and the beyond the coherence domain 120 portions of the cache architecture 100 can include fewer or additional elements that may vary depending upon a particular implementation. Although implementations are depicted in the figures and described herein in the context of PIM for purposes of explanation, implementations are not limited to PIM and are applicable to any type and number of processing elements that are located anywhere beyond the coherence point of the coherence domain 110.

III. Completion Level-Specific Write Back of Cached Data

A. Introduction

Figure 2:
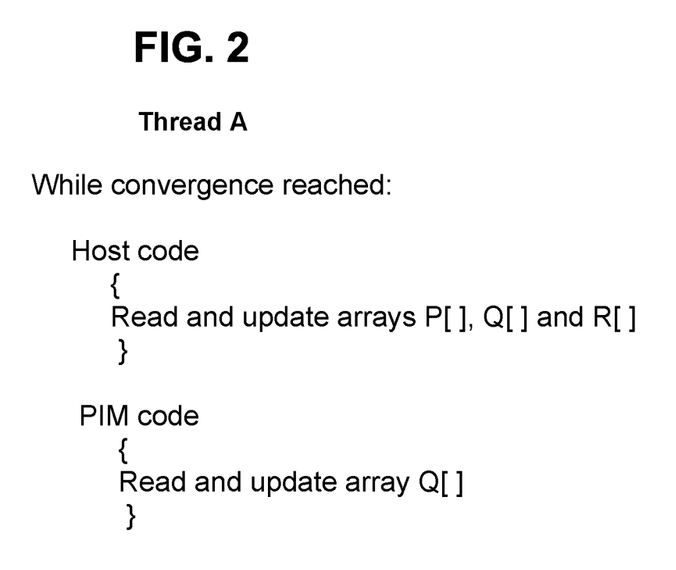
FIG. 2 depicts example pseudo code for a thread that includes a mix of core-centric memory operations (CC-Mem-Ops) and memory-centric memory operations (MC-Mem-Ops).

FIG. 2 depicts example pseudo code for a thread (Thread A) that includes a mix of core-centric memory operations (CC-Mem-Ops) and memory-centric memory operations (MC-Mem-Ops). In this example Thread A includes a host code region ("Host code") that reads and updates arrays P, Q and R using CC-Mem-Ops. These operations are tracked at the core for completion and the ordering for these operations is enforced at the core.

Subsequently, Thread A, in a PIM code region ("PIM code"), reads and updates array Q through functionality that is offloaded to PIM using MC-Mem-Ops, which use a "fire-and-forget" semantic, i.e., the issuing core neither tracks nor enforces ordering for these MC-Mem-Ops. Offloading the subsequent read and update to array Q to PIM via the PIM code region in some situations consumes less memory bandwidth compared to performing the functionality at the core, and also allows the core to proceed to other (independent) operations.

However, such intermixing of CC-Mem-Ops and MC-Mem-Ops creates a technical problem for hardware caches. Assuming there is locality in the read and update of arrays P, Q and R, it is beneficial for Thread A to cache these arrays as it accesses them. For example, as depicted in FIG. 1, assuming that Thread A executes on core Core-0, arrays P, Q, and R have been loaded from the memory 124 into the private cache 112. However, for correctness, the updates to array Q made by the CC-Mem-Ops that are stored in cache must be pushed to memory before the MC-Mem-Ops are allowed to operate on array Q, or else the MC-Mem-Ops will not be operating on the most recent version of array Q. In the example of FIG. 1, the updates to array Q in the private cache 112 made by the CC-Mem-Ops of the Host code must be pushed to the memory 124 before the MC-Mem-Ops of the PIM code of FIG. 2 are allowed to operate on array Q, or else the MC-Mem-Ops will not be using the updated version of array Q stored in the private cache 112. Also, the updates to array Q in the memory 124 made by the MC-Mem-Ops of the PIM code must be used by subsequent CC-Mem-Ops instead of the stale values for array Q in the private cache 112. This requires that a cache flush/invalidate mechanism be employed to ensure that subsequent CC-Mem-Ops will retrieve array Q from the memory 124 instead of using array Q from the private cache 112 so that the CC-Mem-Ops will operate on the most recent version of array Q stored in the memory 124 that includes any modifications made by the MC-Mem-Ops.

One solution is to this technical problem is to flush all of the processor-side caches to memory before invoking the PIM code region. In the present example, this would involve flushing arrays P, Q and R from the private cache 112 to the memory 124. Flushing all of the processor side caches, or even a subset of processor side caches is, however, a heavyweight operation that consumes a considerable amount of computational and storage resources and can be wasteful if data that does not need to be flushed is included in the flushing operations. For example, if the arrays P, Q and R include values that have not been updated, flushing all of the data in arrays P, Q and R from the private cache 112 to the memory 124 is wasteful. Also, flushing arrays P, Q and R from the private cache 112 all the way to the memory 124 is wasteful if the MC-Mem-Ops of the PIM code region are performed in the memory-side cache 126 instead of in the memory 124 because the flushing pushes the arrays beyond the point where they are needed, e.g., all the way to the memory 124 when the array values are only needed in the memory-side cache 126. In addition, flushing processor side caches requires caches to be managed at the application level, which can be burdensome, especially if the Host code, e.g., CC-Mem-Ops, and the PIM code, e.g., MC-Mem-Ops, are interleaved at a finer granularity.

Another solution is for the host code, e.g., CC-Mem-Ops, to access array Q with non-temporal loads and non-temporal stores, but this prevents realizing the many benefits of using caches for core-centric computations and is insufficient in systems that have memory-side caches that are always checked on memory as such caches may not abide by uncached access semantics. A further solution is to include memory and memory-side caches in the coherence domain, but this would greatly increase the complexity of coherence protocols. So, it is clear that all of these solutions have significant technical disadvantages.

B. Invoking Write Back Functionality

According to an implementation, a technical solution to the aforementioned technical problem uses a MC-Mem-Op-Cached memory command to invoke write back functionality to cause cache and memory controllers to selectively flush dirty cached data pertaining to the MC-Mem-Op-Cached memory operation from caches to the completion level of the MC-Mem-Op-Cached memory operation and update the coherence states appropriately. For example, according to an implementation in FIG. 2 the PIM code to read and update array Q is in the form of a MC-Mem-Op-Cached instruction that indicates to cache and memory controllers that write back functionality should be invoked. According to an implementation, MC-Mem-Op-Cached commands specify a completion level that is beyond the coherence domain, such as a memory-side cache, or an Nth-level memory (DDR, NVRAM, etc.), etc. For example, in FIG. 1 the completion level may be the memory-side cache 126 or the memory 124 in the beyond the coherence domain 120 portion of the cache architecture 100.

According to an implementation, MC-Mem-Op-Cached memory commands are implemented by a new primitive or a new semantic of an existing MC-Mem-Op primitive. For example, one or more unused bit values, unused bits, or any combination of unused bit values and unused bits may be used to specify that write back functionality should be used and to specify a completion level of the MC-Mem-Op-Cached memory operation. The particular unused bit values and/or bits used to indicate that write back functionality should be used, and a completion level of the memory operation may be specified by preconfigured policies and/or runtime conditions. Implementations are described herein in the context of cache controllers for purposes of explanation, but implementations are not limited to this context and are applicable to memory controllers.

According to an implementation, command processing logic in a cache controller is configured to process MC-Mem-Op commands in the memory pipeline to determine whether the memory-centric memory operation commands are MC-Mem-Op-Cached commands. For example, a cache controller may determine that a PIM command is a MC-Mem-Op-Cached command by examination, applying a bit mask, etc.

Figure 3:
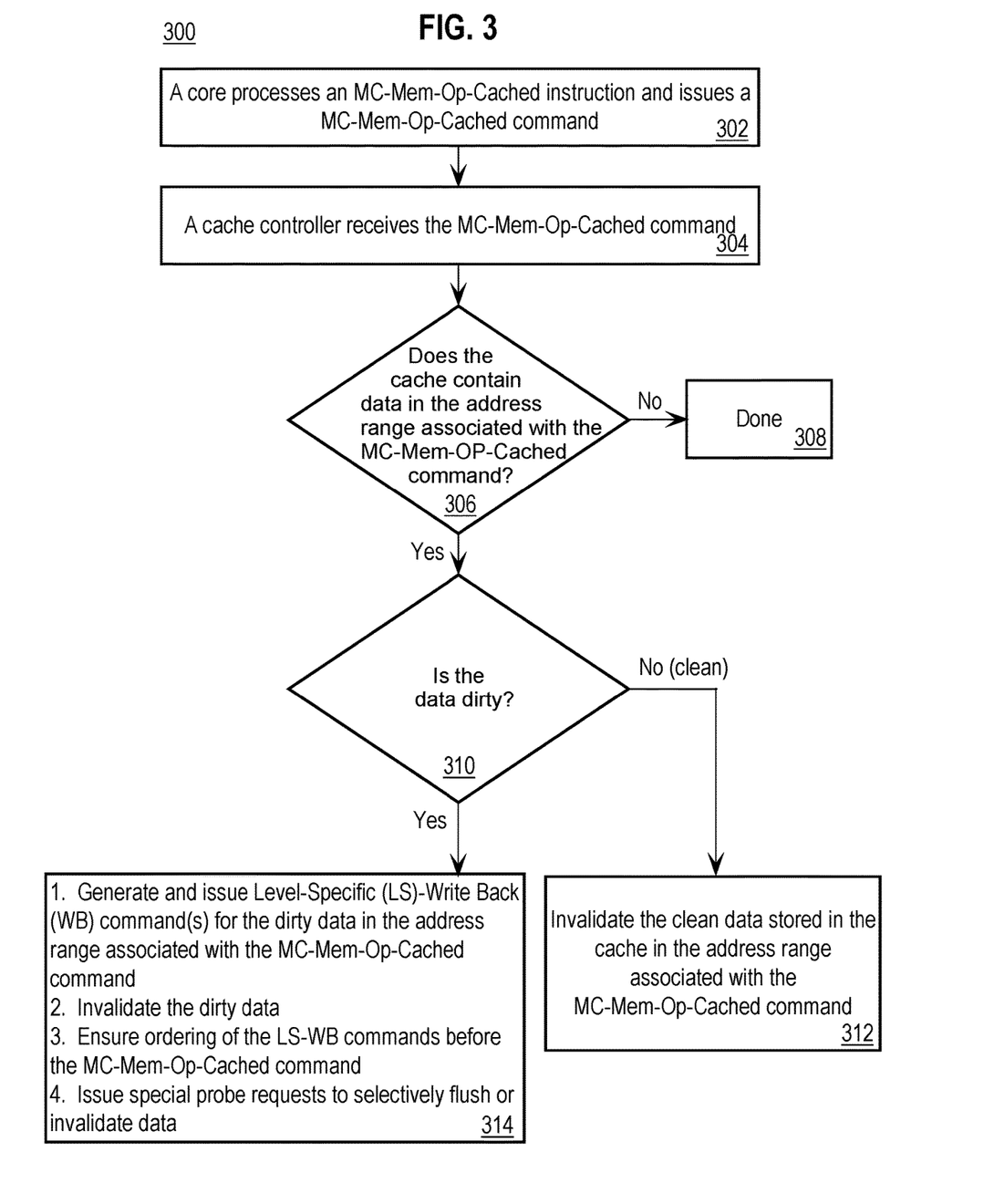
FIG. 3 is a flow diagram that depicts write back functionality performed by a cache controller.

Once a cache controller determines that a memory-side processing command is a MC-Mem-Op-Cached command, the cache controller invokes write back functionality. FIG. 3 is a flow diagram 300 that depicts write back functionality performed by a cache controller. The functionality of FIG. 3 may be implemented, by example, by memory command processing logic in a cache controller or a memory controller, such as a cache controller for the private caches 112, 114 or the shared cache 116, or the memory controller 122.

In step 302, a core processes an MC-Mem-Op-Cached instruction and issues a MC-Mem-Op-Cached command into the memory pipeline of the architecture. For example, the "Read and update array Q[ ]" operation of FIG. 2 can be implemented using one or more MC-Mem-Op-Cached instruction(s) by using particular nomenclature, a symbol such as "+" etc., along with a specified completion level to signal a compiler to generate MC-Mem-Op-Cached instruction(s). For example, when the completion level is the memory-side cache 126, the MC-Mem-Op-Cached instruction specifies the memory-side cache 126 as the completion level.

When executed, the MC-Mem-Op-Cached command, with the indicated completion level, flows down through the memory pipeline to its corresponding completion level where it is processed. For example, the MC-Mem-Op-Cached command flows down through the memory pipeline to a memory-side cache 126 or the memory 124 at the completion level. At the completion point, the MC-Mem-Op-Cached command is ordered after level specific write back commands for dirty data and invalidations of clean data for data cached closer to the core(s) than the completion level that the MC-Mem-Op-Cached command needs to access. This ensures that dirty data from caches will be stored at the completion level before the MC-Mem-Op-Cached command operates on that data.

At each cache level, until the completion point, the MC-Mem-Op-Cached command is processed by one or more cache or memory controllers. In step 304, a cache controller receives the MC-Mem-Op-Cached command and in step 306, determines whether its corresponding cache stores data in an address range that corresponds to the MC-Mem-Op-Cached command. For example, suppose that the MC-Mem-Op-Cached command performs a read and update to array Q as depicted in FIG. 2. The cache controller for the private cache 112 determines whether the private cache 112 stores data for array Q. This can be determined, for example, by consulting the coherence directory 118, consulting data maintained by the cache controller for the private cache 112 or accessing the tags of the private cache 112.

If, in step 306, the cache controller determines that its corresponding cache does not store data in the address range that corresponds to the MC-Mem-Op-Cached command, then the processing is complete in step 308. In this situation there is no data in the corresponding cache for the cache controller that is needed for the MC-Mem-Op-Cached command. For example, suppose that the private cache 112 does not store any values for array Q. In this situation since the MC-Mem-Op-Cached command operates on array Q, the cache controller for the private cache 112 does not need to take any further action.

If, in step 306, the cache controller determines that its corresponding cache does store data in the address range that corresponds to the MC-Mem-Op-Cached command, then in step 310 a determination is made whether the data is dirty data. Continuing with the prior example, in step 306 the cache controller for the private cache 112 determines that the private cache 112 does store data for array Q and in step 310 determines whether the data stored in the private cache 112 is dirty data. The cache controller for the private cache 112 can determine whether the data is dirty data by consulting the coherence directory 118, e.g., by checking a bit value or issuing a request, depending upon how the coherency protocol is implemented.

If, in step 310, a determination is made that the data stored in the cache is not dirty, i.e., not modified, then the data is clean data and in step 312, the clean data is invalidated. For example, the cache controller for the private cache 112 determines that the private cache 112 stores data for array Q, but the data is unmodified, i.e., is clean data. The cache controller for the private cache 112 can invalidate the clean data via the coherence directory 118 by, for example, setting a bit value in the coherence directory 118, issuing a request to the coherence directory 118, etc., depending upon the particular coherency mechanism employed by the cache architecture 100.

Invalidating the clean data in the cache provides the technical benefit of ensuring that a subsequent processor-side memory command operates on the most recent version of the data because the invalidation will force the data to be retrieved from memory or from the completion point of the MC-Mem-Op-Cached command, including any updates made by the MC-Mem-Op-Cached command. Continuing with the prior example, suppose that the private cache 112 stores clean data for array Q, as depicted in FIG. 1. The cache controller for the private cache 112 invalidating the data for array Q stored in the private cache 112 forces any subsequent processor-side memory operations on array Q to retrieve the data for array Q from the memory 124 instead of the private cache 112. This ensures that any updates made to array Q by the MC-Mem-Op-Cached command are used in the subsequent processor-side memory operations.

C. Level Specific Write Back Commands

If, in step 310, a determination is made that the data stored in the cache is dirty, i.e., modified, then in step 314, several steps are performed to move the dirty data to the completion level of the MC-Mem-Op-Cached command and update the coherence state of the dirty data appropriately. These can include flushing the dirty data to the completion level using LS-WB commands, invalidating the dirty data, ensuring ordering of the LS-WB commands before the MC-Mem-Op-Cached command, and issuing special probe requests to selectively flush or invalidate data, each of which are described in more detail hereinafter.

According to an implementation, the cache or memory controller flushes the dirty data to the completion level of the MC-Mem-Op-Cached command by issuing one or more level specific (LS)-write back (WB) commands. For example, the cache controller for the private cache 112 issues one or more LS-WB commands to cause the dirty data for array Q to be flushed to the completion level of the MC-Mem-Op-Cached command so that the dirty data for array Q is available at the completion level to be operated on by the MC-Mem-Op-Cached command. According to an implementation, a cache controller issues an LS-WB command for each dirty cache block in the address range that corresponds to the MC-Mem-Op-Cached command. Examples are described herein in the context of cache blocks, but implementations are not limited to cache blocks and are applicable to any type and size of data unit, depending upon the granularity supported by the cache hierarchy. A LS-WB command can be implemented by a new command or by a new semantic of an existing command, such as a WB command but with bit values and/or bits that indicate a specific level in a memory hierarchy that the dirty data should be stored to.

In the example of FIG. 2 where the MC-Mem-Op-Cached command reads and updates array Q, suppose that the private cache 112 stores 1000 modified elements of array Q, one per cache block. The cache controller for the private cache 112 generates and issues 1000 LS-WB commands, one for each dirty cache block. An example LS-WB command includes a dirty cache block, a corresponding address, and a completion level. The completion level is obtained from the MC-Mem-Op-Cached command. Thus, LS-WB commands originate at the cache level that stores the dirty data and flow down through the memory pipeline until the completion level of the MC-Mem-Op-Cached command. At each cache level from the originating cache level until the completion level, the corresponding cache block for each LS-WB command is invalidated. If an LS-WB command crosses the coherence domain boundary, e.g., from the coherence domain 110 to the beyond the coherence domain 120, the coherence directory 118 is updated to invalidate the corresponding cache block. The use of LS-WB commands in this manner causes dirty data to be evicted from the originating cache to the completion level, i.e., to a cache or memory at the completion level.

At the completion level, a cache or memory controller stores the dirty data from the LS-WB command in its corresponding cache or memory, respectively. Also, the coherence directory 118 is updated if the completion level is within the coherence domain 110. For example, suppose that the cache controller for the private cache 112 issues a LS-WB command with a completion level of the shared cache 116. The corresponding cache block is invalidated at the private cache 112 and the dirty cache block is stored in the shared cache 116. In addition to issuing LS-WB commands, the cache controller that issues the LS-WB commands also invalidates the dirty data in the corresponding cache. In the prior example, the cache controller for the private cache 112 invalidates the 1000 dirty cache blocks in the private cache 112.

Figure 4:
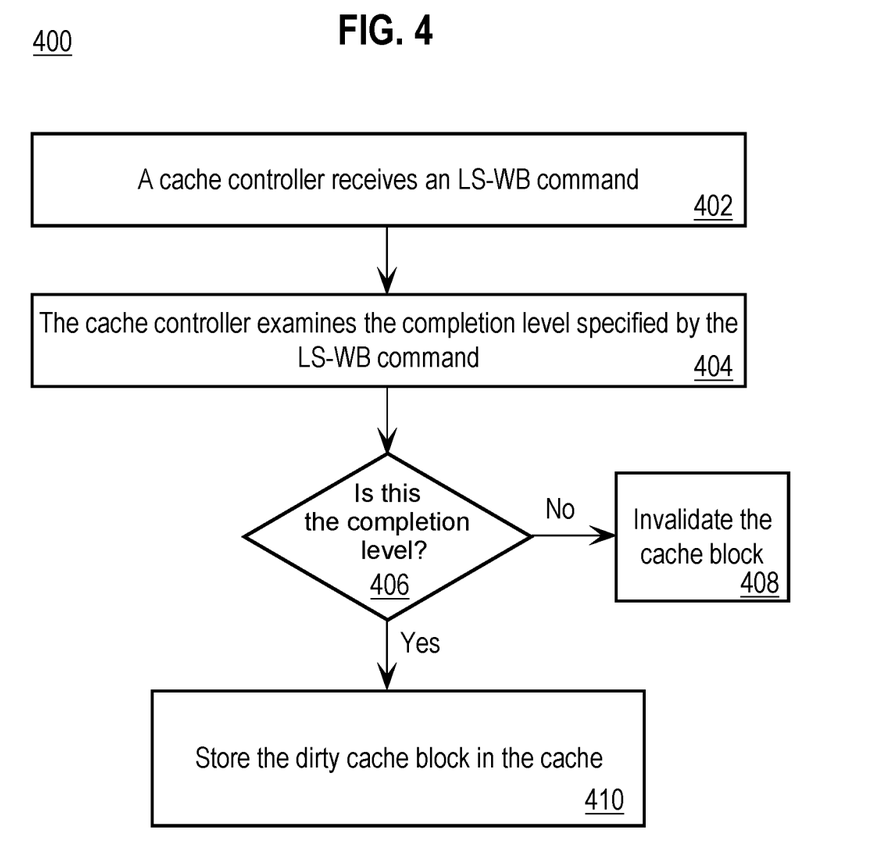
FIG. 4 is a flow diagram that depicts steps performed by a cache or memory controller to process a LS-WB command.

FIG. 4 is a flow diagram 400 that depicts processing of an LS-WB command by a cache controller or a memory controller. In step 402, a cache controller or a memory controller receives a LS-WB command. For example, suppose that the cache controller for the shared cache 116 receives a LS-WB command that was issued by the cache controller for the private cache 112 and the LS-WB command specifies a completion level of the memory-side cache 126.

In step 404, the cache controller or the memory controller examines the completion level specified by the LS-WB command. In the present example, the cache controller for the shared cache 116 examines the completion level specified by the LS-WB command issued by the cache controller for the private cache 112.

In step 406, a determination is made whether the current level is the completion level. For example, the cache controller for the shared cache 116 compares its level to the completion level specified in the LS-WB command, e.g., by performing a comparison, applying a bit mask, etc.

If, in step 406, the level of the cache controller is not the completion level, then in step 408, the cache block is invalidated. Since in this example the LS-WB command specifies a completion level of the memory-side cache, the shared cache 116 is not at the completion level specified by the LS-WB command. The cache controller for the shared cache 116 invalidates the cache block that corresponds to the LS-WB command by invalidating the address specified in the LS-WB command in the coherence directory 118. This provides the technical benefit of ensuring for correctness that cache levels between the cache level at which the LS-WB command was issued and the completion level do not store valid copies of the cache block specified in the LS-WB command. In the present example, this prevents the shared cache 116 from storing a valid copy of the cache block specified in the LS-WB command, which in turn prevents a subsequent CC-Mem-Op from using a copy of the cache block stored in the shared cache 116 when a potentially modified version of the same cache block is stored beyond the coherence domain 110.

According to an implementation, the particular approach used to invalidate a cache block at a cache level between the level at which a LS-WB command was issued and the completion level is dependent upon the type of memory operation of the MC-Mem-Op-Cached command and the coherence state of the cache block. For example, if the MC-Mem-Op-Cache command is a read-only type command and the cache block is clean, then in step 408 the cache block is not invalidated. In the prior example, the cache controller for the shared cache 116 does not invalidate a clean, i.e., unmodified, copy of the cache block stored in the shared cache 116. Conditioning invalidation of clean data in caches based upon the type of memory operation in this manner still ensures correctness because it is known that the data will not be modified at the completion level since the memory operation is a read-only type memory operation.

If, in step 406, the level of the cache or memory controller is the completion level, then in step 410, the dirty data is stored in the corresponding cache. In the prior example, once the LS-WB command reaches the level of the memory-side cache 126, the cache controller for the memory-side cache 126 stores the dirty cache block into the memory-side cache 126. As another example, if the LS-WB command has a corresponding completion level of memory, then the memory controller 122 causes the dirty cache block to be stored to memory. If the completion level is within the coherence domain 110, then the cache controller at the completion level updates the coherence directory 118. After steps 406 and 408, the cache controller sends the LS-WB command to the next level in the memory hierarchy.

The aforementioned approach for using LS-WB commands is applicable to dirty data stored in caches within the coherence domain 110 and in the beyond the coherence domain 120 region. For example, LS-WB commands will evict dirty data from the memory-side cache 126 to the memory 124 if the memory 124 is the completion level for the corresponding MC-Mem-Op-Cached command. The approach of FIG. 4 can be performed at each level in a cache hierarchy for each LS-WB command.

D. Enforcing Ordering of Level Specific Writeback Commands

According to an implementation, memory-centric ordering primitives are used to ensure the processing order of LS-WB commands at the completion level and more specifically, that LS-WB commands are processed before MC-Mem-Op-Cached commands at the completion level. This ensures that the dirty cached data is moved from cache to the completion level before the memory operations of MC-Mem-Op-Cached commands that operate on the dirty cached data are performed.

According to an implementation, a cache or memory controller issues memory centric ordering primitives (MC-OPrims) after LS-WB commands and before MC-Mem-Op-Cached commands to ensure that LS-WB commands are processed at completion levels before MC-Mem-Op-Cached commands. Memory-centric ordering primitives are described in U.S. patent application Ser. No. 16/808,346 entitled "Lightweight Memory Ordering Primitives," filed on Mar. 3, 2020, the entire contents of which is incorporated by reference herein in its entirety for all purposes. MC-OPrims flow down the memory pipe from the core to the memory to maintain ordering en route to memory. MC-OPrims follow the same "fire and forget" semantics of MC-Mem-Ops because they are not tracked by the core and allow the core to process other instructions.

Consider again the prior example of FIG. 2 where the private cache 112 stores a dirty cache block for an element of array Q. The cache controller for the private cache 112 generates and issues an LS-WB command followed by a memory-centric ordering primitive, and then the MC-Mem-Op-Cached command. The ordering primitive ensures that the LS-WB command will remain ahead of all MC-Mem-Op commands, including the MC-Mem-Op-Cached command, throughout the memory pipeline and at the completion level. This, in turn, ensures that the dirty cache block will be stored at the completion level before the memory operation of the MC-Mem-Op-Cached operation is performed so that the memory operation will operate on the values for array Q stored in the dirty cache block.

According to an implementation, a single memory-centric ordering primitive is used for a group of LS-WB commands that correspond to an address range. Referring to the prior example where the private cache 112 stores 1000 modified elements of array Q, one per cache block, and the cache controller for the private cache 112 generates and issues 1000 LS-WB commands, one for each dirty cache block. Instead of issuing a memory-centric ordering primitive after each LS-WB command, the cache controller issues a single memory-centric ordering primitive after the last LS-WB command in the address range for array Q, i.e., after the $1000^{th}$ LS-WB command. In this implementation, the memory-centric ordering primitive will ensure that the LS-WB commands remain ahead of the MC-Mem-Op-Cached command in the memory pipeline all the way to the completion level. This may include the cache controller buffering the MC-Mem-Op-Cached command until all of the LS-WB commands in the group have been issued. This approach provides the technical benefit of reducing the amount of computational and storage resources consumed by reducing the number of memory-centric ordering primitives that are issued.

According to another implementation, cache and memory controllers do not issue memory-centric ordering primitives. Instead, the core issuing a MC-Mem-Op-Cached command issues a memory-centric ordering primitive after issuing the MC-Mem-Op-Cached command. As previously described herein, the MC-Mem-Op-Cached command, and all of the LS-WB commands generated by cache controllers in the memory pipeline, flow to the completion level, along with the memory-centric ordering primitive. At the completion level, a cache (or memory) controller stores the LS-WB commands and the MC-Mem-Op-Cached command.

Once the memory-centric ordering primitive is received, the cache controller orders the stored LS-WB commands before the memory-centric ordering primitive, followed by the MC-Mem-Op-Cached command, so that an ordering constraint is enforced with respect to the LS-WB commands and the MC-Mem-Op-Cached command. More specifically, this ensures that the memory operations for the LS-WB commands, i.e., storing of dirty cache data to the cache at the completion level, are completed before the memory operation of the MC-Mem-Op-Cached command is performed, so that the memory operation operates on the most recent dirty data evicted from the caches by the LS-WB commands.

This implementation may be used by a core issuing multiple MC-Mem-Op-Cached commands. For example, a core may issue N number of MC-Mem-Op-Cached commands followed by a single memory-centric ordering primitive. All of the LS-WB commands generated by caches in the memory pipeline and the MC-Mem-Op-Cached commands are stored by the cache controller at the completion level until the memory-centric ordering primitive is received. Then, as in the prior example with a single MC-Mem-Op-Cached command, once the memory-centric ordering primitive is received, the cache controller orders the stored LS-WB commands before the MC-Mem-Op-Cached command to ensure that all of the cache evictions are completed before the MC-Mem-Op-Cached command is allowed to proceed.

Although described herein in the context of storing the LS-WB commands, the MC-Mem-Op-Cached command, and the memory-centric ordering primitive at the completion level, implementations are not limited to this example and the LS-WB commands, the MC-Mem-Op-Cached command, and the memory-centric ordering primitive may be stored anywhere beyond the cache coherence domain boundary, i.e., in the beyond the coherence domain 120 of FIG. 1.

According to an implementation, cache controllers defer the processing of MC-Mem-Op-Cached commands until a memory-centric ordering primitive is received. For example, cache controllers may store MC-Mem-Op-Cached commands in a command processing queue and continue to process LS-WB commands until a memory-centric ordering primitive is received. At that point, the cache controller has all of the LS-WB commands that were issued for the MC-Mem-Op-Cached commands and the cache controller processes the queued MC-Mem-Op-Cached commands. According to an implementation, up to a specified maximum number of MC-Mem-Op-Cached commands may be stored by a cache controller to prevent the command processing queue from becoming full and causing deadlocks.

E. Coherence Directory Implementations

According to an implementation, a coherence directory manages the eviction or invalidation of cached data for MC-Mem-Op-Cached commands. When an MC-Mem-Op-Cached command crosses the coherence domain 110, the coherence directory 118 issues cache probes (requests) to the caches in the coherence domain 110 that store data in the address range that corresponds to the MC-Mem-Op-Cached command and delays the MC-mem-Op-Cached command until cache probe responses from each of the caches are received and processed.

Once the coherence directory 118 has received a cache probe response from each of the caches, the coherence directory 118 issues a corresponding LS-WB command for every probe response with dirty data and a memory-centric ordering primitive and allows the MC-Mem-Op-Cached command to proceed. In this manner the coherence directory 118 uses cache probes to manage evictions of cached data for MC-Mem-Op-Cached commands.

Figure 5:
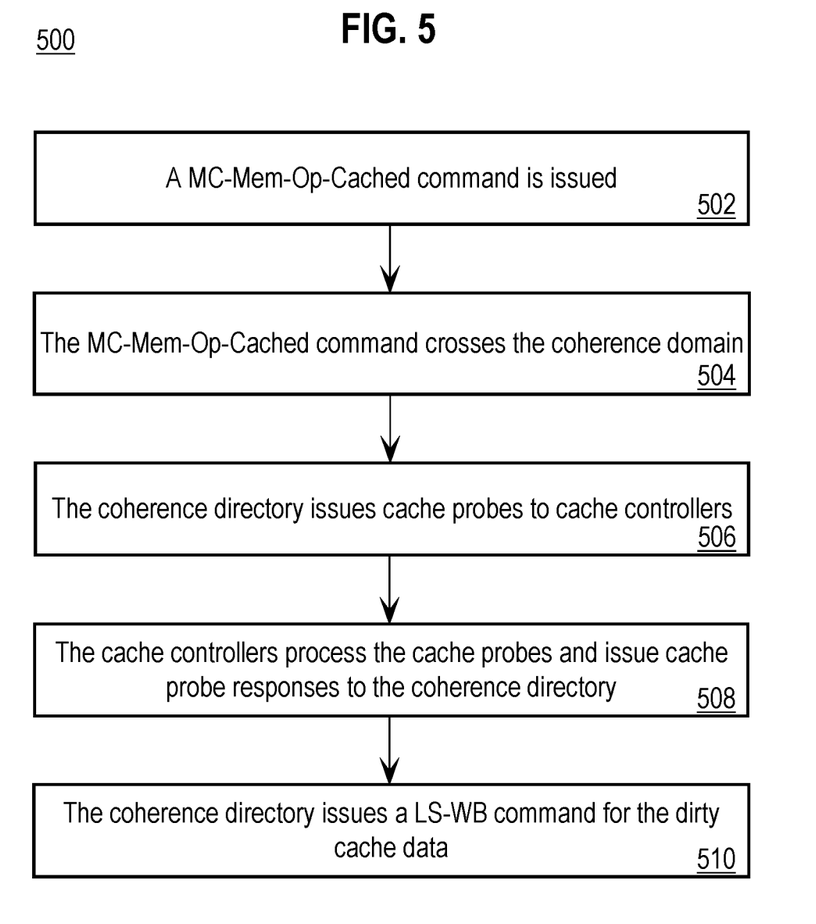
FIG. 5 is a flow diagram that depicts a coherence directory managing the eviction or invalidation of cached data for MC-Mem-Op-Cached commands.

FIG. 5 is a flow diagram 500 that depicts a coherence directory managing the eviction or invalidation of cached data for MC-Mem-Op-Cached commands. Referring again to FIGS. 1 and 2, suppose that a MC-Mem-Op-Cached command reads and updates array Q in the memory-side cache 126 or the memory 124 and the private cache 112 stores a dirty cache block that has an address in array Q. In step 502, the MC-Mem-Op-Cached command is issued, for example by Thread A executing on core Core-0, and flows down through the memory pipeline.

In step 504, the MC-Mem-Op-Cached command crosses the coherence domain 110 and in step 506, the coherence directory issues cache probes to the cache controllers. For example, in FIG. 1, the coherence directory 118 issues cache probes to the cache controllers for the private caches 112, 114 and the shared cache 116. According to an implementation, each cache probe specifies the address range that corresponds to the MC-Mem-Op-Cached command, which in this example is the address range for array Q.

In step 508, each cache controller processes the cache probe received from the coherence directory and issues a cache probe response back to the coherence directory. In the present example, the cache controllers for the private caches 112, 114 and the shared cache 116 process the cache probes from the coherence directory 118 and issue cache probe responses back to the coherence directory 118. According to an implementation, a cache probe response indicates whether the cache has dirty data within the address range specified by the cache probe and if so, the dirty data. In the present example, the cache controllers for the private cache 114 and the shared cache 116 issue cache probe responses to the coherence directory that indicate that their respective caches do not store any dirty data in the address range specified by the cache probe. In the present example, since the private cache 112 stores dirty data in the address range for array Q, the cache controller for the private cache 112 issues, to the coherence directory 118, a cache probe response that carries the dirty data for array Q.

In step 510, the coherence directory 118 issues an LS-WB command for the dirty data, e.g., for the dirty cache block in the address range for array Q. According to an implemented, the coherence directory 118 also issues an ordering primitive after the LS-WB command. is processed before the MC-Mem-Op-Cached command at the completion level. The memory-centric ordering primitive ensures that at the completion level, the LS-WB command operations, i.e., the operations that store the dirty data at the completion level, are completed before the MC-Mem-Op-Cached command memory operation is performed. The LS-WB command, the memory-centric ordering primitive, and the MC-Mem-Op-Cached command flow down through the memory pipeline and are processed at the completion level as previously described herein. According to an implementation, the coherence directory 118 performs the above process for a batch of multiple MC-Mem-Op-Cached commands and issues a single memory-centric ordering primitive for the batch of MC-Mem-Op-Cached commands, subject to available storage.

According to an implementation, when an MC-Mem-Op-Cached command crosses the coherence domain 110, the coherence directory 118 issues special cache probes to cause cache controllers in the coherence domain 110 to selectively evict dirty cache data. The special cache probes specify an address range that corresponds to a MC-Mem-Op-Cached command to be evicted and a completion level, and direct cache controllers to determine whether their corresponding caches store dirty data in the address range and issue LS-WB commands using the specified completion level if they do. The special probes also cause the cache controllers to invalidate clean data stored in their respective caches that are in the address range that corresponds to the MC-Mem-Op-Cached command. In the prior example, when an MC-Mem-Op-Cached command crosses the coherence domain 110, the coherence directory issues special cache probes to the cache controllers for the private caches 112, 114 and the shared cache 116.

When a cache controller receives a special cache probe, the cache controller determines whether its corresponding cache stores data in the address range specified in the special cache probe, i.e., within the address range that corresponds to the MC-Mem-Op-Cached command. If the cache stores dirty data within the specified range, the cache controller issues a LS-WB command and invalidates the dirty data. If the cache stores clean data within the specified range, the cache controller invalidates the clean data. Continuing with the prior example, where the private cache 112 stores a dirty data block in the address range for array Q, the special probe causes the cache controller for the private cache 112 to issue a LS-WB command for the dirty cache block and invalidate the dirty data block, using the techniques previously described herein. If the private cache 114 or the shared cache 116 store clean data within the address range for array Q, then the cache controllers for the private cache 114 and the shared cache 116 invalidate the clean data. As previously described herein, in some situations the cache controller allows clean copies of data in the address range that correspond to the MC-Mem-Op-Cached command to remain in caches for read-only type MC-Mem-Op-Cached commands. According to an implementation, the cache controller also issues a memory-centric ordering command after the LS-WB command, or after a batch of LS-WB commands. So, unlike the prior implementation described herein where the coherence directory 118 received dirty data from cache controllers and issued LS-WB commands, in this implementation, the cache controllers themselves evict dirty data from their respective caches to the completion level specified in the special cache probe by issuing LS-WB commands.

The technical solution described herein to the technical problem of how to support memory-centric operations on cached data provides an efficient and correct way to selectively make dirty cached data that is needed for memory-centric memory operations available at the completion levels of the memory-centric memory operations. The solution avoids flushing data from caches that is not needed for memory-centric memory operations and also does not flush data beyond the completion level of the memory-centric memory operations where it is needed. This allows cores to issue memory-centric memory operations on potentially cached data while maintaining the single-writer-or-multiple-reader guarantee. The solution also allows fine-grained interleaving of memory-centric and core-centric memory operations without explicit cache management at the application level.

What is claimed is:

1. A cache controller:
configured to, in response to determining that dirty data stored in a cache has a corresponding address that is within an address range for a processing in memory (PIM) command, issue a command to selectively cause the dirty data that is stored in the cache to be stored at a completion level of the PIM command.

2. The cache controller of claim 1, wherein the completion level of the PIM command is beyond a coherence point of a memory system that includes the cache controller.

3. The cache controller of claim 2, wherein the completion level of the PIM command is a memory side cache, or an Nth level memory.

4. The cache controller of claim 1, wherein the command to cause the dirty data that is stored in the cache to be stored at a completion level of the PIM command specifies the completion level of the PIM command.

5. The cache controller of claim 1, wherein the cache controller is further configured to issue an ordering command to cause the command to cause the dirty data that is stored in the cache to be stored at the completion level of the PIM command to be ordered before the PIM command.

6. The cache controller of claim 5, wherein the ordering command is ordered after the command to cause the dirty data that is stored in the cache to be stored at the completion level of the PIM command and before the PIM command.

7. The cache controller of claim 1, wherein the cache controller is further configured to issue an ordering command to cause a plurality of commands that cause the dirty data stored in the cache to be stored at the completion level of the PIM command to be ordered before the PIM command.

8. The cache controller of claim 1, wherein the cache controller is further configured to cause a coherence state for the cache to be updated to indicate that the cache no longer stores the dirty data.

9. The cache controller of claim 8, wherein the cache controller is further configured to in response to determining that clean data stored in the cache has a corresponding address that is within the address range for a PIM command, cause the coherence state for the cache to be updated to indicate that the cache no longer stores the clean data.

10. A cache controller comprising:
cache controller configured to, for a command to selectively store dirty data that has a corresponding address that is within an address range for a processing in memory (PIM) command, completing storing the dirty data to a cache that corresponds to the cache controller before performing a memory operation for the PIM command.

11. The cache controller of claim 10, wherein the command to store the dirty data and the PIM command both have a corresponding completion level of the cache controller.

12. The cache controller of claim 10, wherein the cache controller is further configured to delay storing the dirty data to the cache that corresponds to the cache controller until a memory-centric ordering primitive is received.

13. A coherence directory
configured to:
receive a response from a cache controller indicating that a cache stores dirty data that has a corresponding address that is within an address range for a processing in memory (PIM) command; and
issue a command to cause the dirty data that is stored in the cache to be selectively stored at a completion level of the PIM command.

14. The coherency directory of claim 13, wherein the command to cause the dirty data that is stored in the cache to be stored at a completion level of the PIM command specifies the completion level of the PIM command.

15. The coherency directory of claim 13, wherein the coherency directory is further configured to delay the PIM command until responses have been received and processed for all caches within a coherence domain for the coherence directory.

16. The coherency directory of claim 13, wherein the coherency directory is further configured to issue a memory-centric ordering primitive to enforce an ordering constraint with respect to the command to cause the dirty data that is stored in the cache to be stored at the completion level of the PIM command and the PIM command.

17. The coherency directory of claim 16, wherein the memory-centric ordering primitive is issued after the command to cause the dirty data that is stored in the cache to be stored at the completion level of the PIM command and before the PIM command.

18. The coherency directory of claim 13, wherein the completion level of the PIM command is a memory side cache, or an Nth level memory.

19. The coherency directory of claim 13, wherein the coherency directory is further configured to one or more of:
cause a coherence state for the cache to be updated to indicate that the cache no longer stores the dirty data, or
in response to a second response from a second cache controller indicating that a second cache stores clean data that has a corresponding address that is within the address range for a PIM command, cause a coherence state for the second cache to be updated to indicate that the cache no longer stores the clean data.

20. The coherency directory of claim 13, wherein the coherency directory is further configured to issue, to one or more cache controllers, a request that specifies an address range for a PIM command and a completion level for the PIM command, wherein processing of the request by the one or more cache controllers causes the one or more cache controllers to issue a command to cause dirty data that is stored in their respective caches to be stored at the completion level of the PIM command and invalidate the dirty data with respect to their respective caches.

* * * * *